July 5, 1938.   J. F. KOCA   2,122,613
REMOTE CONTROL MECHANISM FOR RADIO RECEIVING SETS
Filed Oct. 14, 1929   12 Sheets-Sheet 1

Fig. 1

July 5, 1938.   J. F. KOCA   2,122,613
REMOTE CONTROL MECHANISM FOR RADIO RECEIVING SETS
Filed Oct. 14, 1929   12 Sheets-Sheet 3

Inventor:
James F. Koca,
By Chas. M. Nissen,
Atty.

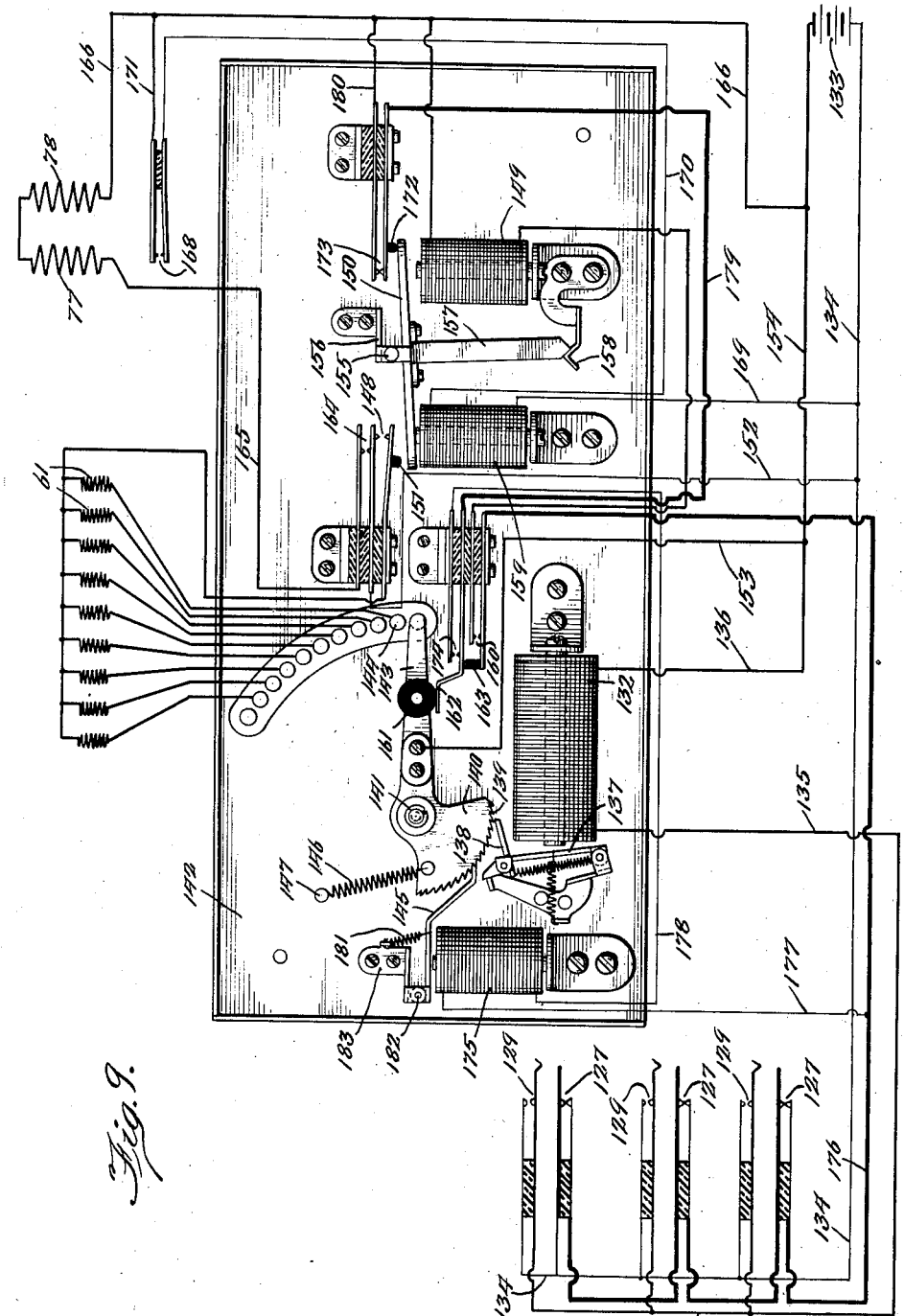

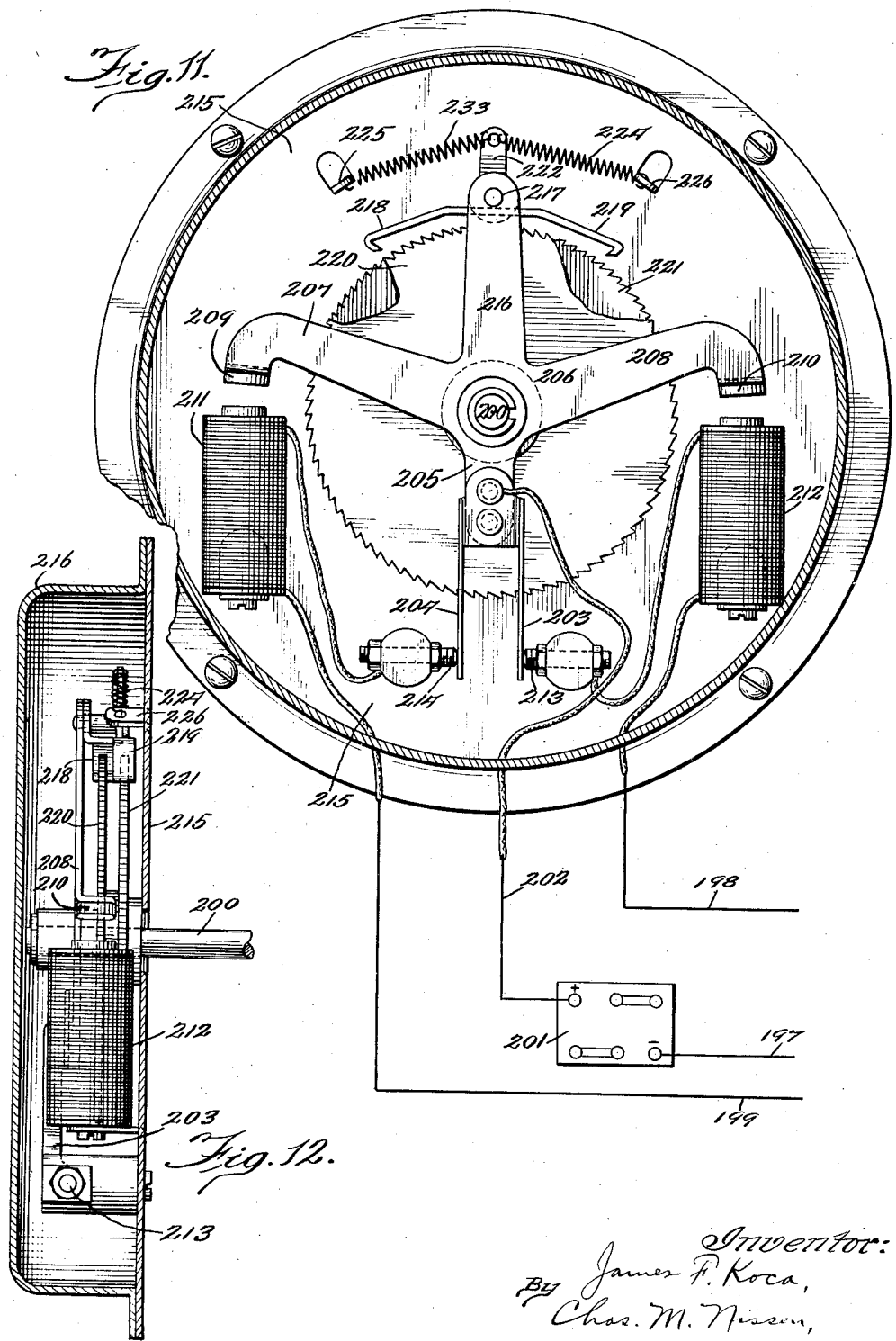

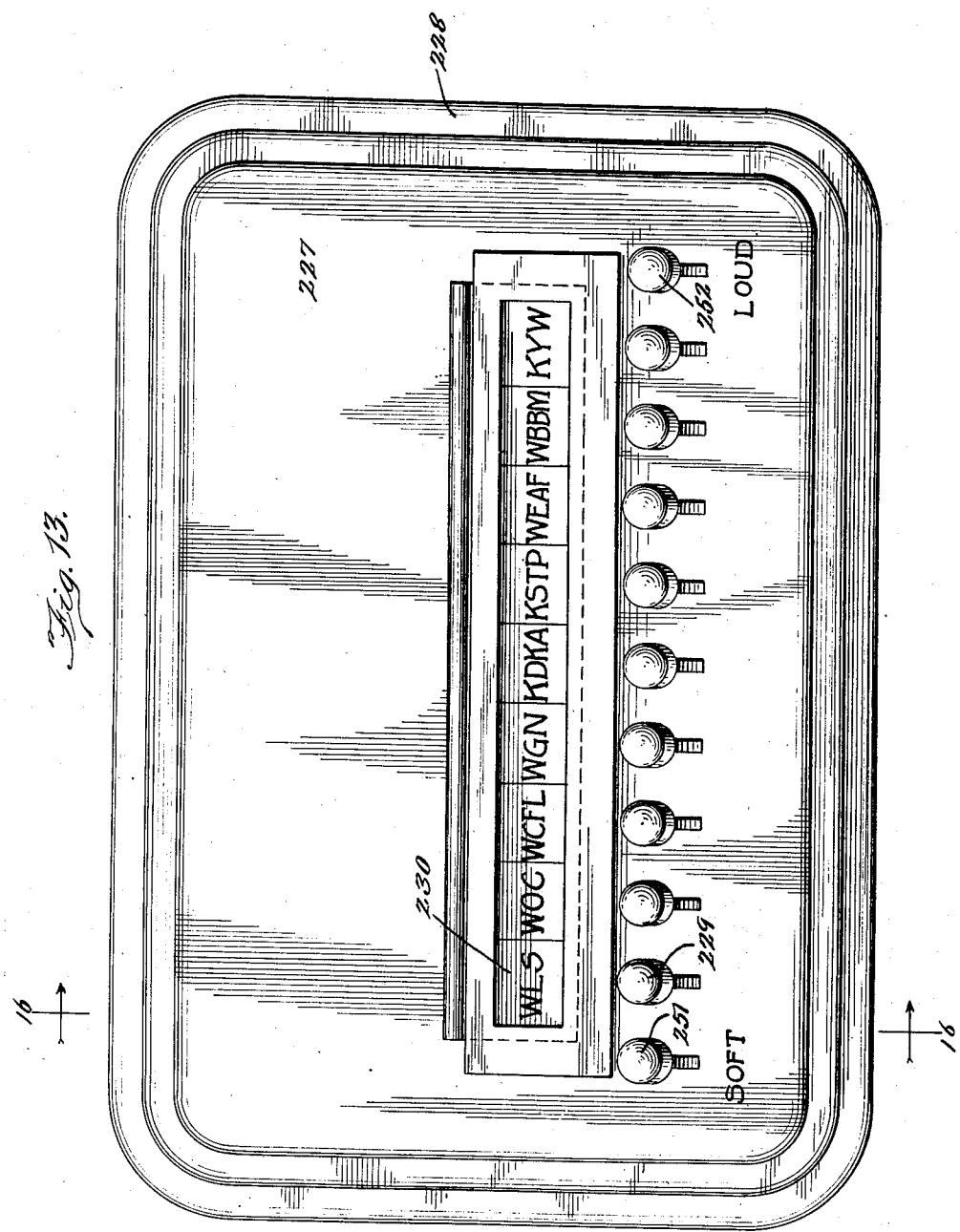

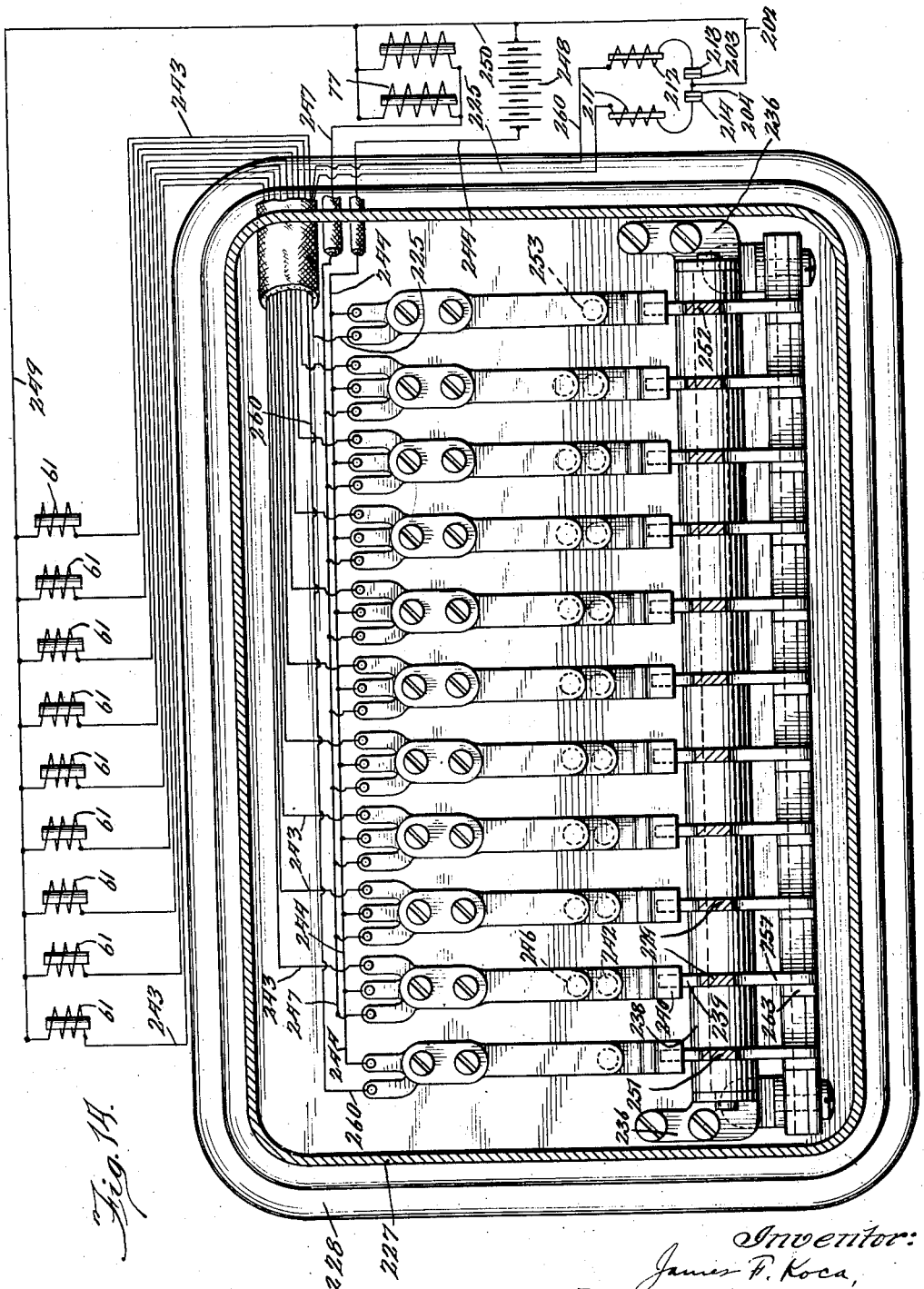

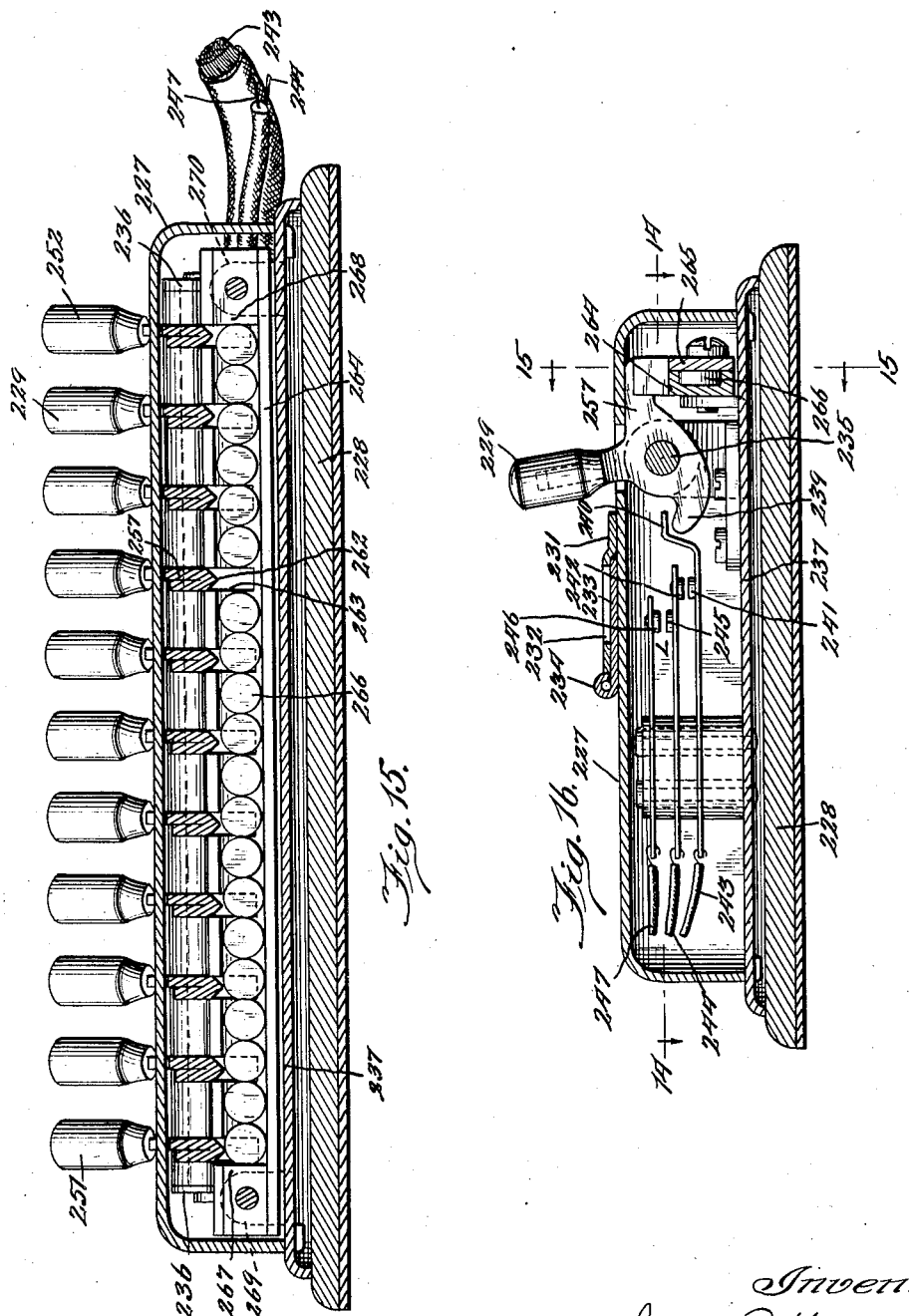

Patented July 5, 1938

2,122,613

UNITED STATES PATENT OFFICE 2,122,613

REMOTE CONTROL MECHANISM FOR RADIO RECEIVING SETS

James F. Koca, Woodstock, Ill., assignor to Richard W. Sears, II, Chicago, Ill.

Application October 14, 1929, Serial No. 399,465

15 Claims. (Cl. 250—20)

My invention relates to remote control mechanism for radio receiving sets, and one of its objects is the provision of an improved and efficient system for selectively tuning in any one of a plurality of broadcasting stations.

Another object of the invention is the provision of improved and efficient mechanism for controlling from any one of a plurality of points distant from a receiving set of radio apparatus the tuning in of any one of a plurality of broadcasting stations.

A further object of the invention is the provision of electro-magnetic selective operating mechanism of adjustable tuning apparatus for a radio receiving set.

Another object of the invention is the provision of a plurality of remote control devices for selectively tuning in a radio receiving set with a speaker associated with each remote control device.

A further object of the invention is the provision of electrical interlocking switch mechanism for selective tuning mechanism of a radio receiving set to compel a predetermined sequence in the operation thereof.

Another object of the invention is the provision of remote control mechanism of a selectively tuned radio receiving set to vary the volume of the received signals.

Another object of the invention is the provision of improved and efficient transmitting mechanism for a remotely controlled selective system of a station radio receiving set.

Other objects of the invention will appear hereinafter, the novel features and combinations being set forth in the appended claims.

In the accompanying drawings—

Fig. 1 is a sectional elevation of my improved mechanism adapted to be connected to the operating shaft of tuning elements of a radio station receiving set;

Fig. 8 is a rear view of a portion of the interior mechanism of the dial transmitter;

Fig. 9 is a wiring diagram of the electrical mechanism, circuits and connections for the dial transmitter and the selective tuning-in apparatus;

Fig. 10 is a wiring diagram for the switch shown in Fig. 6 to connect the radio receiving set to the source of electric power therefor;

Fig. 11 is an elevational view of the mechanism for controlling the volume of the signals received by means of the switch at the lower right-hand portion of Fig. 5;

Fig. 12 is a side elevational view of the operating mechanism shown in elevation in Fig. 11;

Fig. 13 is a plan view of a modified form of transmitter;

Fig. 14 is a sectional plan view of the interior structure of Fig. 13 connected to the electro-magnets controlled thereby in a wiring diagram, this sectional plan view being taken on the line 14—14 of Fig. 16 looking in the direction of the arrows;

Fig. 15 is a sectional elevational view of the key mechanism for the transmitter of Figs. 13 and 14 to show the interlocking mechanism which prevents more than one key from being operated at a time, this sectional view being taken on the line 15—15 of Fig. 16 looking in the direction of the arrows;

Fig. 16 is a sectional elevational view taken on the line 16—16 of Fig. 13 looking in the direction of the arrows.

By referring to Figs. 1 to 4, inclusive, it will be seen that the selective tuning mechanism is mounted in the casing 18 and is provided with a shaft 19 which may be connected by means of a coupler 20 to the shaft 21 of a radio receiving set, this shaft 21 being the actuator for the tuning elements of the radio receiving set.

Figure 3:
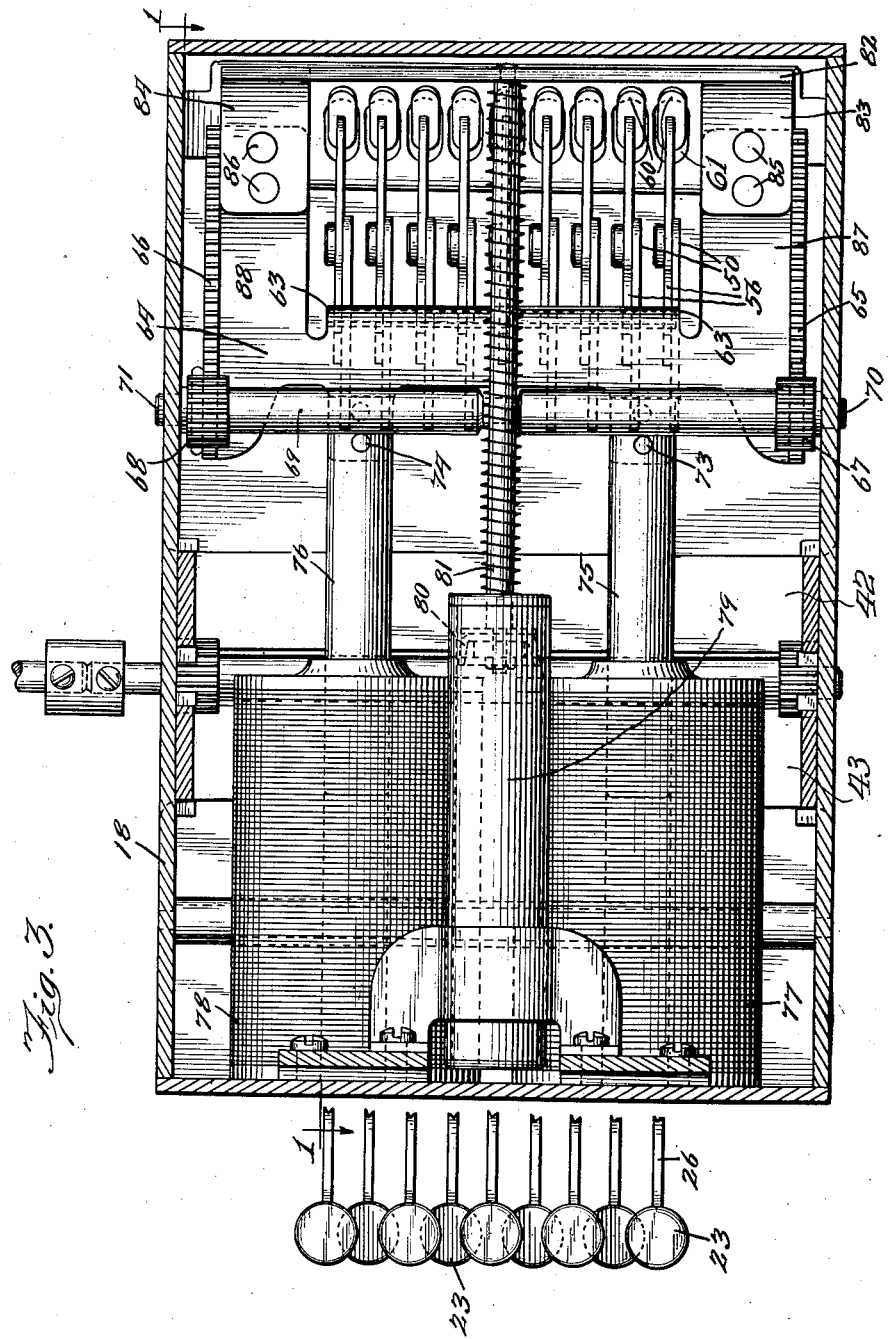
Fig. 3 is a sectional plan view of the structure shown in Fig. 1, with the top of the casing removed.
Figure 4:
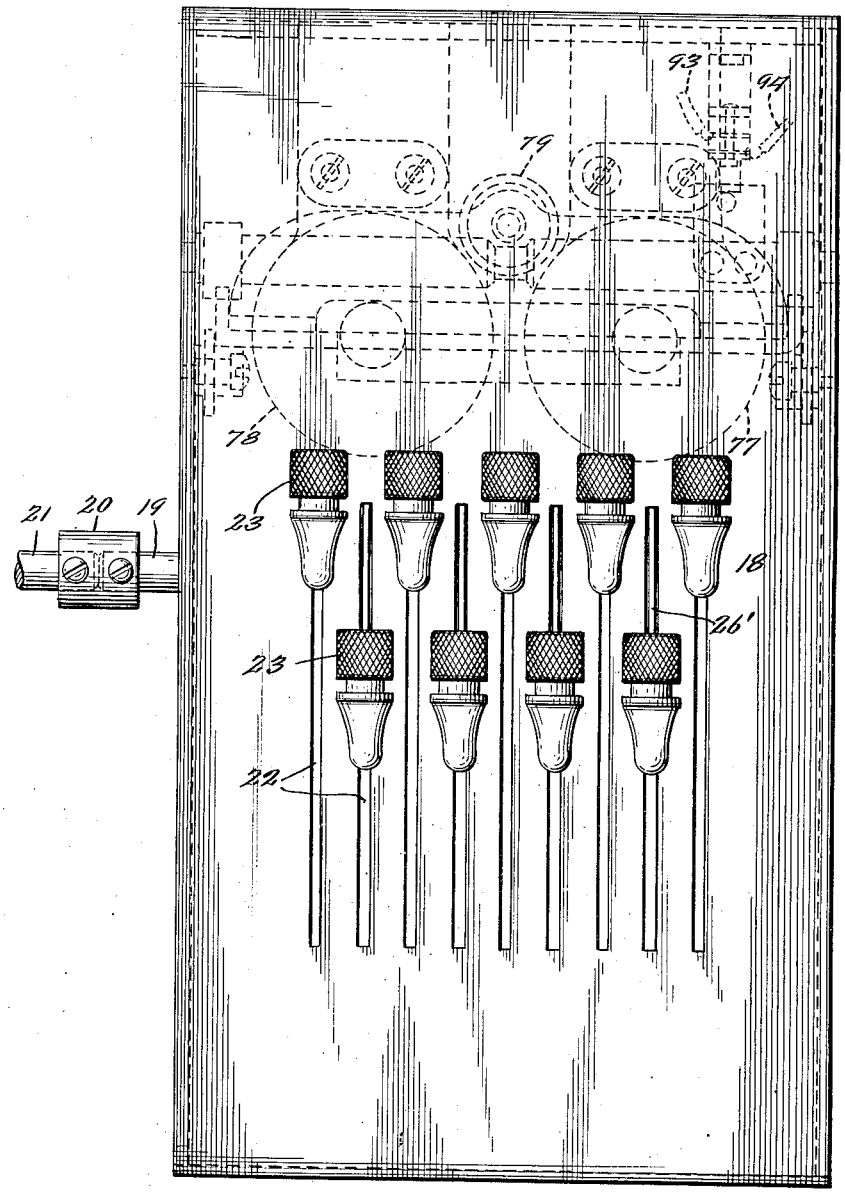
Fig. 4 is a front elevational view of our improved selective tuning-in mechanism adapted to be connected to the tuning shaft of the radio receiving set.

Projecting through the slots 22 in the front face of the casing 18 is a plurality of actuating lever devices as shown in Figs. 1 and 4, each provided with a push-button 23 in the form of a screw-threaded cap knurled on its cylindrical surface. There are as many of these push-buttons 23 as broadcasting stations which are to be tuned in for the receiving set. For instance, in Figs. 2 to 4, inclusive, each push-button represents a separate broadcasting station and the apparatus may therefore be set for tuning in nine separate broadcasting stations.

As shown in Fig. 1, the lever 24 is pivoted at 25. An auxiliary lever 26 is pivoted at 27 to the lever 24. Projecting downwardly from the lever 24 is a bracket arm 28 to the lower end of which is pivoted at 29 a segment 30 which has an upper arcuate surface to receive the brake-shoe 31 which is pivoted at 32 to the lever 24. A heel 33 on the lever 26 near the pivot 27 is adapted to engage the upper left-hand end of the brake-shoe 31. When the screw-cap 23 is threaded on the clamp 34 as shown in Fig. 1, the two levers 24 and 26 are drawn together with the result that the heel 33 applies the brake-shoe 31 to the upper arcuate surface of the segment 30 and holds the latter in adjusted position. The clamp 34 has a recess in its lower end to receive the detent 35 at the outer end of the lever 24. The finger 36 at the outer end of the lever 26 fits in the clamp 34 and projects upwardly into the screw-cap 23. Therefore when the cap-screw 23 is screwed down over the clamp 34 the detent 35 and the finger 36 are drawn toward each other to cause the heel 33 to apply the brake-shoe 31 to the segment 30 to hold the latter in fixed position on the pivot 29 relative to the lever 24.

Figure 2:
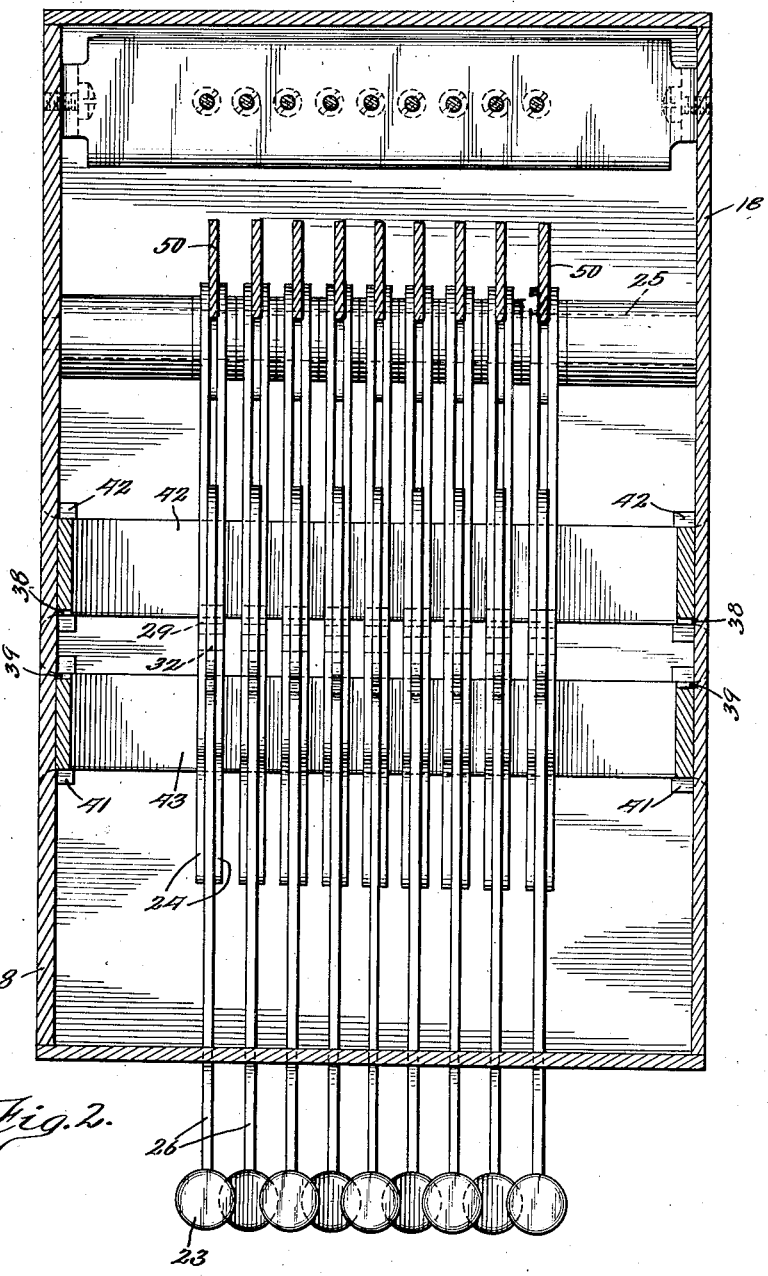
Fig. 2 is a sectional plan view taken on the line 2—2 of Fig. 1.

On the ends of the shaft 19 are pinions 37. In mesh with the opposite sides of each pinion 37 is a pair of vertical rack bars 38, 39 suitably guided at 40, 41 to move along vertical lines. The lower ends of the rack bars 38 and 39 are provided with transverse horizontal cross plates 42 and 43 in position to be engaged by the toes 44 and 45 of the segment 30. As shown in Figs. 1 and 2, the rack bars may be connected at their upper ends by cross plates 42', 43' to form rectangular or square rack frames.

When a desired station is tuned in at the radio receiving set by means of the usual dials thereon, the tuning shaft 21 will transmit movement to the pinions 37. Two of the pairs of rack bars will be moved up and the other two will be moved down. In Fig. 1 it has been assumed that for a certain predetermined broadcasting station the pinion 37 will move the rack bars 38 and 39 so that the plates 42 and 43 will be in the same horizontal plane. Now by holding the radio receiving set tuning shaft 21 in the desired position to cause the radio receiving set to receive signals from a predetermined broadcasting station, the rack bars 38 and 39 will be held stationary. By loosening the cap 23 the brake-shoe 31 will be released and the segment 30 will be free to turn on the pivot 29. Upon depressing the push-button 23 together with the levers connected thereto to the dotted line position shown at 46 in Fig. 1, the toes 44 and 45 will engage the plates 42 and 43 and move the segment 30 on the pivot 29 to the position shown in dotted lines. Then upon tightening the cap 23 the brake-shoe 31 will be applied to the segment 30 while the toes 44 and 45 still engage the plates 42 and 43. The screw-cap 23 is then retained in its clamping position so as to hold the segment 30 in its adjusted position. Consequently whenever at any subsequent time the push-button 23 is depressed to its dotted line position shown at 46 in Fig. 1, the toes 44 and 45 will engage the plates 42 and 43 and bring them back to their positions shown in Fig. 1. Wherever the rack bars happen to be they will be moved by the toes 44 and 45 engaging the plates 42 and 43 to effect rotation of the shaft 19 through the pinion 37 so as to re-locate the shaft 21 in its exact predetermined position.

It should be understood that for each set of levers there is a separate segment 30 with a brake-shoe 31 applied thereto. The levers 24' and 26' are shown of different shape in Fig. 1 merely to provide more space for the push-buttons 23. Associated with the levers 24' and 26' is a separate arcuate segment together with a separate brake-shoe and there are the same pinions fixed to the shaft 19 and in mesh with two pairs of rack bars. In most instances after a station has been tuned in one of the plates 42 and 43 will be above the other. While held in such positions by holding the shaft 21 stationary at the radio receiving set, the toes 44 and 45 may be brought into contact with the plates 42 and 43 and then locked in position. Subsequent downward pressure on the push-button 23 will then move the rack bars into positions where one of the plates 42, 43 will be in the same relative positions as before, one at a higher elevation than the other.

When the various double lever devices have been operated to lock their respective segments in adjusted positions the spring 47 will act on the arm 48 connected to the lever 24 and move the levers 24 and 26 to their uppermost positions where they will be stopped by the abutment 49.

Pivoted to the bearing shaft 25 is a lever 50 which is provided with a slot 51 into which projects a pin 52 from the lever 24. A spring 53 is connected between an arm 54 on the lever 50 and the lever 24. The spring 53 therefore tends to move the lever 50 in an anti-clockwise direction, but this movement is limited by the right-hand end of the slot 51 in the lever 50 impinging against the pin 52 projecting from the lever 24. It should be understood that one lever 50 is provided for each of the levers 24. In other words, the number of the levers 50 equals the number of the levers 24.

To the upper end of the lever 50 is pivoted at 55 a latch pawl 56. A spring 57 connected between the bracket arm 58 on the lever 50 and the right-hand portion of the latch pawl 56 draws the latter downwardly against the stop 59 on the lever 50. The left-hand end of the latch pawl 56 is provided with a magnetic armature 60 which is associated with the upper end of the electro-magnet 61. When the latter is energized the armature 60 is drawn downwardly and the latch pawl 56 is moved into its dotted line position 62 where it will engage the front side of the catch 63 as shown in Fig. 1.

Fig. 3 shows in plan view the various armatures 60 on the latch pawls 56 which are pivoted at the upper ends of the levers 50. The catch 63 is formed by bending down the right-hand edge of the plate 64 as viewed in plan in Fig. 3. The catch 63 is therefore common to all of the nine separate latch pawls 56 shown in Fig. 3 in plan view.

The plate 64 is provided with horizontal spaced-apart rack bars 65, 66 as shown in Fig. 3 and these rack bars mesh with pinions 67 and 68, the ends 70 and 71 of which are journaled in bearings in the sides of the casing 18. On axes which are in vertical alinement with the axis of the shaft 69 are rollers 72 for the bottom sides of the plate 64 beneath the rack bars 65 and 66.

Connected at 73 and 74 to the plate 64 are plungers 75 and 76 of iron which project into the solenoids 77 and 78 respectively, as shown in Fig. 3. These solenoids are connected in series and when they are energized, the plungers 75 and 76 will be pulled toward the left, as viewed in Fig. 3. This movement of the plungers 75 and 76 will draw the plate 64 together with the catch 63 thereon toward the left. It is desirable that the plungers 75 and 76 should be moved equally and in parallelism so that the catch 63 will retain a position at right angles to its path of travel. The rack and pinion mechanism 65, 67 and 66, 68 assure such parallel movement. The racks 65 and 66 are held in mesh with the pinions 67 and 68 by the guide rollers 72 mounted as shown in Fig. 1 so as to engage the under sides and lateral edges of the plate 64 beneath the racks 65 and 66.

When one of the selector electro-magnets 61 is energized, it attracts its armature 60 so as to move the latch 56 into its left hand dotted line position, as viewed in Fig. 1. Then, when the solenoids 77 and 78 are energized, the catch 63 will move the latch 56 to its right hand dotted line position. Consequently, the lever 50 will be moved to its right hand dotted line position and when this occurs, the arm 54 will exert a pull through the spring 53 on the adjusted lever mechanism 24, 26 so as to move the locked segment 30 to its lower-most position. In Fig. 1, the segment 30 is shown so locked in position that when the lever mechanism is moved to its dotted line position designated 46, the toes 44 and 45 of the segment 30 will engage the plates 42 and 43 to move the vertical rack bars 38 and 39 into their full line positions. This will cause the pinions 37 and the shaft 19 to rotate to a predetermined position in order to tune in a certain predetermined broadcasting station.

It should be particularly noted that the pull between the lever 50 and the tuning mechanism is through a spring 53. This is for the purpose of enabling a very accurate movement of the shaft 19 to be made without any interference from the electro-magnetic mechanism comprising the solenoids 77 and 78. The shaft 19 is accurately set to tune in a predetermined broadcasting station and if the electro-magnetic mechanism comprising the solenoids 77 and 78 pulls the lever 50 slightly beyond the desired position for the tuning in mechanism, the slot 51 may ride over the pin 52 on the lever 24. It will thus be seen that by reason of the pin and slot connection at 51, 52 between the levers 50 and 24, lost motion between these levers is provided so that accuracy of the setting of the shaft 19 need not depend upon the accurate stopping of the plungers 75 and 76. It is preferred to have the plungers 75 and 76 stop beyond the limit of the movement of the lever 24 so that the slot 51 will ride over the pin 52 thereby enabling the spring 53 to yieldingly hold the toes 44 and 45 in engagement with the plates 42 and 43 and thus very accurately, in every instance, set the shaft at its predetermined position to tune in a certain predetermined broadcasting station.

In order that the plungers 75 and 76 will not be drawn or pulled into the solenoids 77 and 78 too suddenly or quickly when these solenoids are energized, a dash-pot 79 is secured at one end to the inner wall of the front face of the casing 18. This dash-pot is provided with a piston 80 connected to a piston rod 81. The rear end of the piston rod 81 is connected to the cross plate 82 which at its ends is provided with plates 83 and 84 connected at 85 and 86 to the rearwardly projecting plates 87 and 88 which may be integral with the plate 64. Therefore, when the solenoids 77 and 78 are energized and the plate 64 is pulled toward the right, as viewed in Fig. 1, or toward the left, as viewed in Fig. 3, the dash-pot will resist such movement by acting as a brake. When the solenoids 77 and 78 are de-energized, the spring 89 on the piston rod 81 will act to restore the plungers 75 and 76 to their initial positions, and also the catch 63 to its initial position, as shown in full lines in Figs. 1 and 3. It should also be understood that when the solenoids 77 and 78 are de-energized, the spring 47, by acting on the arm 48, will restore the lever 50 to its initial position shown in full lines in Fig. 1. The spring 57 will restore the latch 56 to its initial position shown in full lines in Fig. 1. The slot 51 at its right hand end, as viewed in Fig. 1, will engage the pin 52 on the lever 24 and positively move the levers 24 and 26 back to their initial positions shown in full lines in Fig. 1, where the lever 26 will abut against the limit stop 49.

It should be particularly noted that when the solenoids 77 and 78 are de-energized and the parts shown in Fig. 1 are restored to their initial positions, as shown in full lines, the setting of the shaft 19 is not disturbed. That is to say, when the segment 30 is moved from its dotted line position shown in Fig. 1 to its full line position, the racks 38 and 39 are left exactly where they have been set and consequently the shaft 19 is left in its accurately set position. After a broadcasting station has been tuned in, the solenoids 77 and 78 may be de-energized with the assurance that the receiving set will remain with its tuning shaft in its set position.

Telephone receivers or loud speakers connected to the receiving set, may therefore be cut out during the tuning in of the radio receiving set so that no signals will be received until desired from the particular broadcasting station which is to be tuned in. For this purpose, an electric switch is provided at 90. An actuator 91 is mounted on the upright plate 82 as shown in Fig. 1, in position to engage the spring arm 92 of the switch 90 to hold the latter closed while the spring 89 holds the plungers 75 and 76 in their extreme left-hand positions, as viewed in Fig. 1. When the solenoids 77 and 78 are energized and the plungers 75 and 76 are pulled toward the right as viewed in Fig. 1, the actuator 91 will become disengaged from the spring arm 92, thereby permitting the switch 90 to open and thus open the circuit of the telephone receivers and loud speakers, either or both, which are connected to the terminals 93 and 94. It will thus be seen that during the period of rotation of the shaft 19 to tune in a certain predetermined broadcasting station, the switch 90 will be opened so that although the receiving set is connected for reception of signals, no signals will be heard from the loud speakers or telephone receivers until the switch 90 is again closed. As above explained, when the solenoids 77 and 78 are de-energized, the parts will be restored to their full line positions shown in Fig. 1, and when this occurs, the switch 90 will be closed to restore the connection to the loud speakers and telephone receivers.

As shown in the wiring diagram in Fig. 9, there are as many of the electro-magnets 61 as there are broadcasting stations which are to be tuned in by means of remote control mechanism. A transmitter is therefore provided to select one of the electro-magnets 61 corresponding to the desired broadcasting station. A dial transmitter such as that shown in Figs. 5, 6, 8 and 9 may be used to select the desired electro-magnet 61. The dial transmitter of an automatic telephone set may be modified to adapt the same to our system of control.

Figure 5:
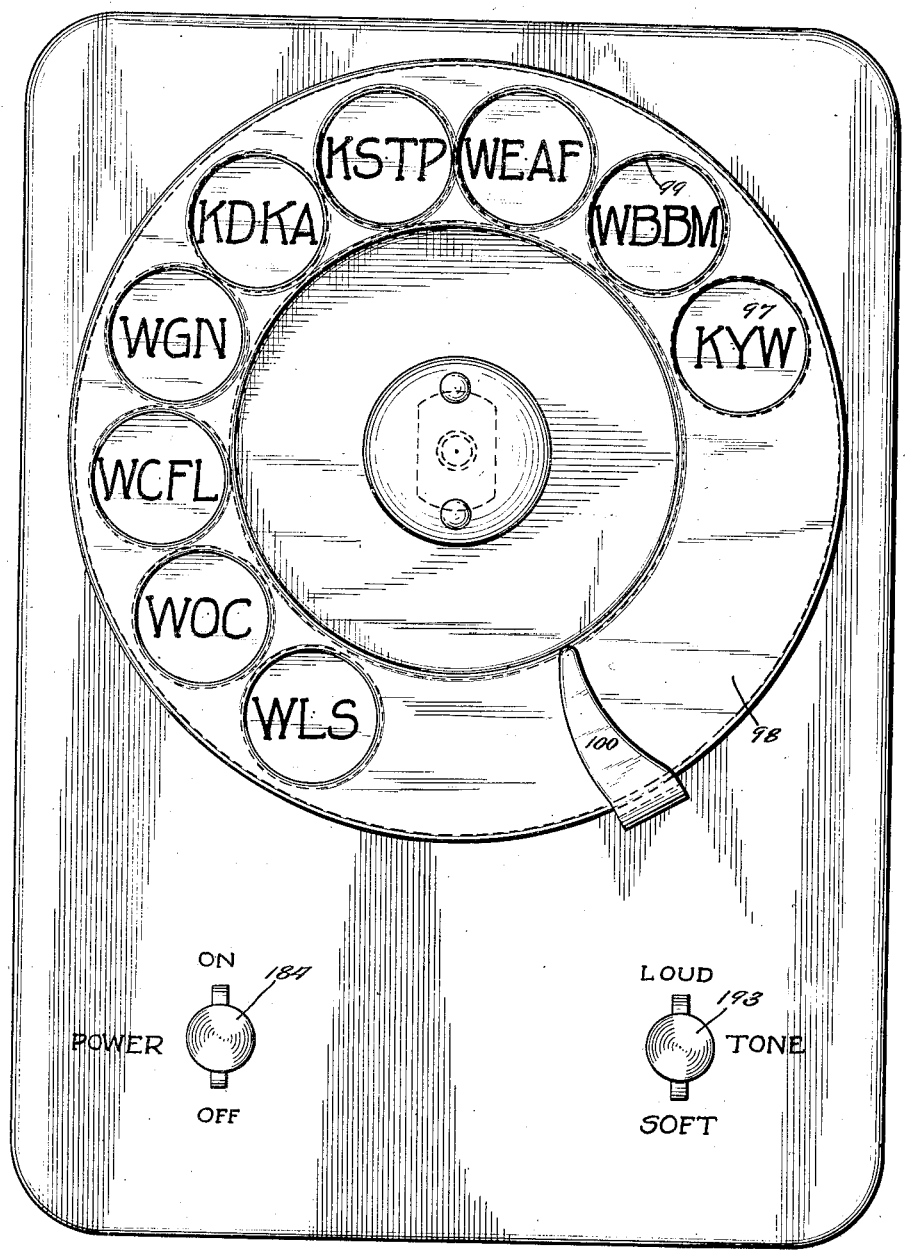
Fig. 5 is an elevational view of the control dial of the remote control transmitter.
Figure 6:
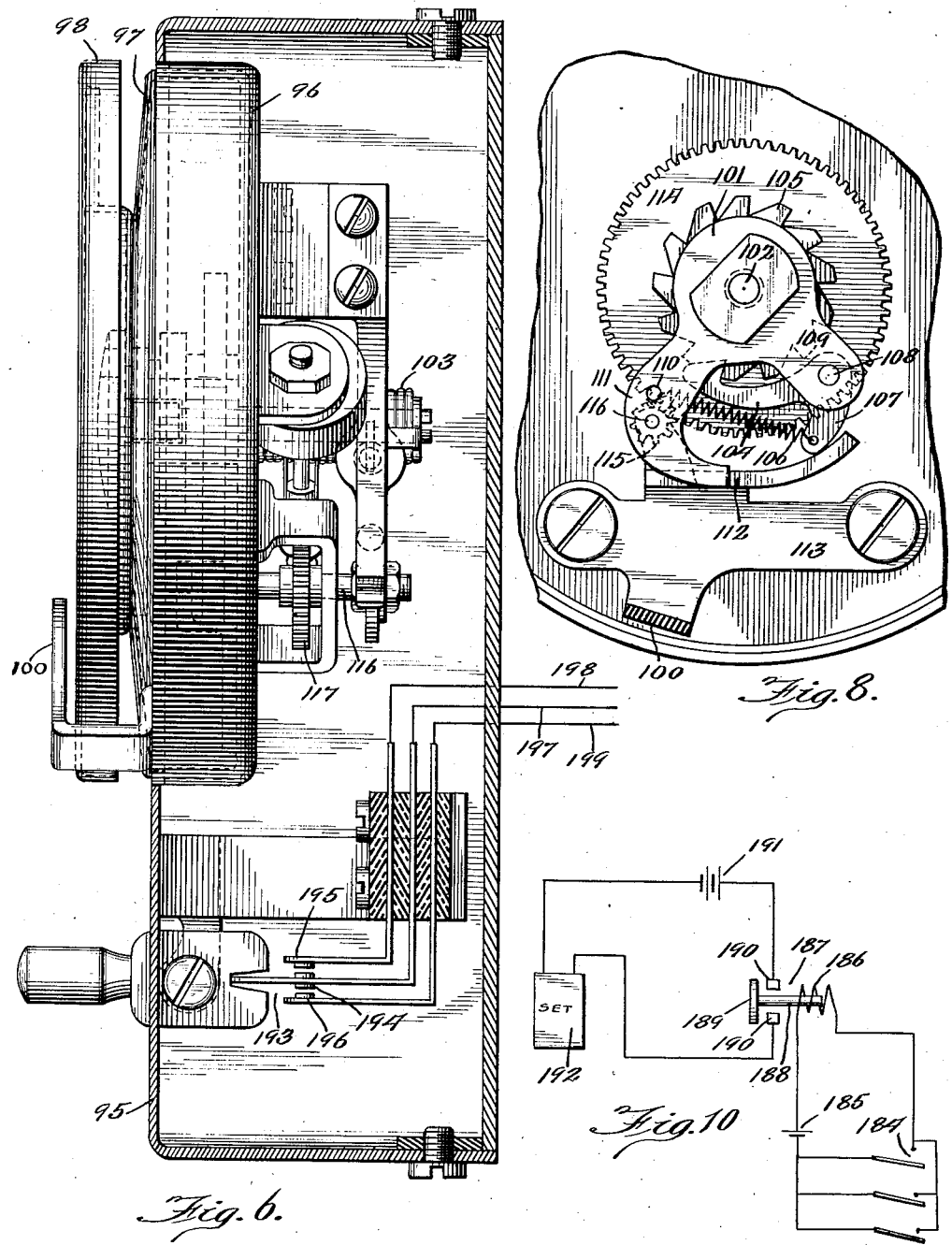
Fig. 6 is a sectional side elevational view of the dial control transmitter shown in Fig. 5.

Secured to the casing 95 is an auxiliary casing 96 to which is secured a ring 97 having thereon in fixed positions the designations of the various broadcasting stations, as shown in Fig. 5. In front of the fixed ring 97 is a rotatable ring 98 having openings 99 therein to receive one of the operator's fingers so that he may rotate the ring 98 until his finger engages the fixed stop 100, the latter being secured to the auxiliary casing 96, as shown in Fig. 6. For instance, if the broadcasting station designated "KYW" is desired, the opening 99 at "KYW" will be engaged and the ring 98 moved through an angle of nearly 45°. Whereas, if the station "WLS" is to be tuned in, the ring 98 will be rotated through an angle of approximately 315°.

Figure 7:
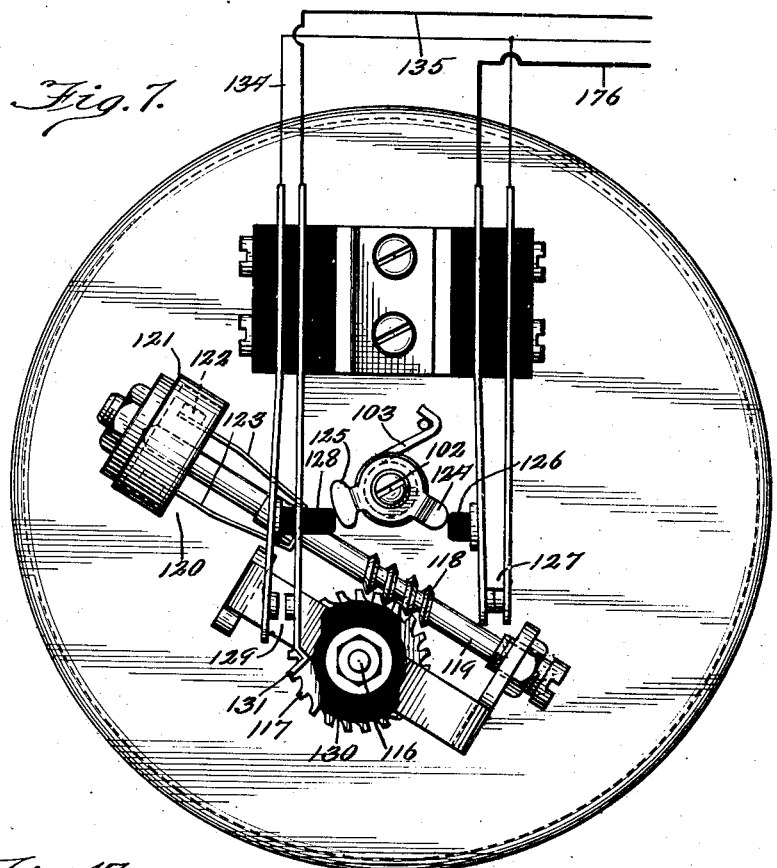
Fig. 7 is a rear view showing the electric switches and the mechanism for operating the same on the rear side of the dial transmitter.

The rotation of the ring 98 in a clockwise direction, as viewed in Fig. 5, effects a clockwise rotation of the plate 101, shown in Fig. 8, and so also of the shaft 102 which is connected thereto. Such rotation of the shaft 102 effects a winding of the spring 103, one end of which is secured to the shaft 102 and the other end of which is connected to the back of the casing 96, as shown in Fig. 7. When the plate 101 is moved in a clockwise direction, as viewed in Fig. 8, the pawl 104 thereon will ride freely over the ratchet teeth 105 as permitted by the spring 106, one end of which is connected to an arm 107 which is pivoted at 108 to the arm 109. The other end of the spring 106 is connected at 110 to the finger 111 which projects from the plate 101.

As before stated, clockwise rotation of the shaft 102, as viewed in Fig. 8, will wind up the spring 103 and therefore when the operator's finger is released from the ring 98, the latter will be rotated anti-clockwise by the spring 103 until the finger 111 abuts against the limit stop 112, shown in Fig. 8 as being integral with the plate 113 to which the finger stop 100 is secured. When the wound up spring 103 thus rotates the ring 98, the shaft 102 and the plate 101 will also be rotated anti-clockwise. This will cause the pawl 104 to engage the ratchet 105 to rotate the latter in an anti-clockwise direction and so also the gear wheel 114 which is secured thereto. The gear wheel 114 meshes with a pinion 115 which is mounted on the shaft 116. The latter projects through the back of the casing 96 and has mounted thereon a worm gear 117 which meshes with a worm 118 on the shaft 119. When the shaft 119 is rotated by the unwinding of the spring 103, the governor 120 acts to retard the rapid rotation of the shaft 119. This governor comprises a cup 121 which is secured to the back of the casing 96 and has an annular cylindrical surface adapted to be engaged by the brake shoes 122 on the spring arms 123 which are attached to the shaft 119 and rotate therewith.

Secured to the shaft 102 so as to rotate therewith are switch actuating devices 124 and 125. When the dial transmitter is in its initial position where the finger 111 abuts against the limit stop 112, the actuator 124 engages the button 126 of insulating material to hold the switch 127 closed, as shown in Fig. 7. At the same time, when the transmitter is in its initial position, the switch actuator 125, by engaging the insulation button 128, holds the switch 129 in open position, as shown in Fig. 7. When the operator, by engaging a station-designated opening 99 in the ring 98, rotates the latter in a clockwise direction, as viewed in Fig. 5, the shaft 102 will be rotated in an anti-clockwise direction as viewed in Fig. 7. Therefore, as soon as the operator moves the ring 98, the switch actuators 124 and 125 shown in Fig. 7 will release the insulation buttons 126 and 128. The actuator 125 is longer circumferentially than the actuator 124 and therefore the button 126 will be released to effect the opening of the switch 127 before the actuator 125 releases the button 128 to permit the switch 129 to close. When the operator's finger engages the stop 100 and the ring 98 is about to be released, the switch 127 will be open and the switch 129 will also be open. The purpose of the actuator 125 engaging the button 128 is to hold the switch 129 in open position so that it cannot be closed by the switch actuator 130 on the shaft 116 except after the ring 98 has been released by the release of the operator's finger from the stop 100. Furthermore, the actuator 125 by engaging the button 128, when the shaft 102 is restored to its initial position, will hold the switch 129 open so that it will not be affected by the last half rotation of the shaft 116 and the actuator 130 thereon.

After the operator has moved the ring 98 as far as the stop 100 will permit and this ring is released, the spring 103 will effect rotation of the gearing above described so as to rotate the double-armed insulated actuator 130. The spring arm 131 of the switch 129 will be actuated twice during each rotation of the shaft 116 so as to effect the closing of the switch 129 and the opening thereof twice during each rotation of the shaft 116.

In Fig. 9, switches 127, 129 of three dial transmitters are diagrammatically illustrated. The dial transmitters may be stationed at various remote places relative to the radio receiving set. For instance, the radio receiving set, together with its batteries and the tuning in apparatus shown in Figs. 1, 2, 3 and 4, may be located in the basement of a dwelling whereas the dial transmitters such as that illustrated in Figs. 5, 6, 7 and 8 may be located in various rooms upstairs.

When the switch 129 is closed by rotation of the insulated actuator 130, the electro-magnet 132 of Fig. 9 will be energized by being connected directly across the terminals of the battery 133. The circuit will be through the conductor 134, switch 129 and the conductor 135, thence through the electro-magnet 132, back to the battery 133, through the conductor 136.

Each time the electro-magnet 132 is energized, the armature 137 will be drawn toward the right, as viewed in Fig. 9, to cause the pawl 138 to engage the ratchet teeth 139 on the segment 140 which is pivoted at 141 to the panel-board 142. The switch arm 143 will be moved in an anti-clockwise direction step by step each time the switch 129 is closed so as to move the right-hand end of the switch arm 143 into engagement with various switch contacts 144 which are connected to the electro-magnets 61 individually and successively. Each time the segment 140 is stepped around, it will be held in the position to which it has been moved by the pawl 145 against the action of the spring 146 which is connected at its upper end 147 to the panel-board 142 and at its lower end to the segment 140.

It should be understood that the dial transmitter is so constructed and arranged that its gearing will effect the desired number of rotations of the actuator 130 to correspond with the desired number of electric impulses necessary in the electro-magnet 132 to step the arm 143 onto the desired contact 144. If the station "KYW" is desired, the actuator 130 will be rotated a predetermined number of times so as to close the switch 129 a sufficient number of times to cause the arm 140 to be stepped onto the first contact 144 and stop there. This will effect a connection to the first electro-magnet 61 at the right hand end of the series shown in Fig. 9. If the station "WLS" is desired, the gear ratio is such that the actuator 130 will be rotated a sufficient number of times to cause the switch 129 to send the necessary number of electric impulses through the electro-magnet 132 to step the arm 143 onto the last contact 144 and thereby connect the electro-magnet 61 which is shown at the left hand end of the series in Fig. 9

During the step by step movement of the arm 143 in an anti-clockwise direction, none of the electro-magnets 61 can be energized because the circuit through them remains open at the switch 148. Not until the operator releases the ring 98 and the latter returns to its initial position can the selected electro-magnet 61 be energized. This is for the reason that only when the dial transmitter is in initial position is the switch 127 closed and only when the latter switch is closed can the electro-magnet 149 be energized to tilt the armature lever 150 to cause the left-hand end thereof to engage the insulated button 151 and close the switch 148. Then, a current of electricity will flow from the battery 133 through the conductors 134 and 152 to and through the switch 148, the selected electro-magnet 61, the contact 144, the switch arm 143, and thence through the conductor 153 which is connected to the arm 143; the return to the battery 133 is through the conductor 154.

The armature lever 150 may be pivoted at 155 to a bracket 156 secured to the panel-board 142. A downwardly projecting detent arm 157 from the center of the armature lever 150 is adapted to engage a detent spring 158 so as to hold the armature 150 in the position to which it has been moved by either the electro-magnet 149 or the electro-magnet 159.

When the electro-magnet 149 becomes energized by the return of the dial transmitter to initial position and the consequent closure of the switch 127, the circuit through the electro-magnet 149 will depend upon the closure of the switch 160. When the switch arm 143 is in its initial position shown in Fig. 9, the insulated button 161 thereon engages the switch arm 162 which, though the insulated button 163, holds the switch 160 open. Therefore, the electro-magnet 149 cannot be energized while the switch arm 143 is in its initial position. As soon as the dial transmitter is operated, the switch 127 will be opened and will remain open until after the switch arm 143 has been moved to its automatically selected position and remains on the selected contact 144. Then, upon the return of the dial transmitter to initial position, the switch 127 is closed and the electro-magnet 149 will be energized because, at this time, the switch 160 is closed. As before stated, the energization of the electro-magnet 149 will cause the armature 150 to engage the button 151 and close the switch 148. The selected electro-magnet 61 will then be energized to move the armature 60 of Fig. 1 to its dotted line position and hold the latch 56 in the latter's dotted line position where it will engage the catch 63.

When the electro-magnet 149 is energized and the button 151 actuated to close the switch 148 to effect energization of the selected electro-magnet 61, the switch 164 will next be closed. That is to say, the switches 148 and 164 close successively so that the electro-magnets 61 will be energized before the switch 164 is closed. The closure of the switch 164 will effect energization of the solenoids 77 and 78, shown in Figs. 1 and 3 and diagrammatically in Fig. 9. A circuit through the solenoids 77 and 78 will be through the conductors 134, 152, switch 164, conductor 165, through the solenoids 77 and 78 and thence back to the battery through the conductor 166. The energization of the solenoids 77 and 78 will cause the setting of the tuning shaft in the desired position corresponding to the selected broadcasting station, as predetermined by the operation of the dial transmitter.

When the solenoids 77 and 78 are energized and the plungers 75 and 76 draw the plate 82 toward the right as viewed in Fig. 1, the rod 167, which is attached to the plate 82, will be drawn toward the right so as to close the switch 168 at the time that the plungers 75 and 76 reach their right-hand positions. The relative position of the switch 168 is shown in Fig. 1, and the circuit therefor is shown in Fig. 9.

When the switch 168 is closed, a circuit is established from the battery 133 through the conductors 134, 169, the electro-magnet 159, the conductor 170, switch 168, and conductors 171, 166, back to the battery 133. The armature lever 150 being held by the detent mechanism 157, 158 is holding the switches 148 and 164 closed but after the solenoids 77 and 78 have been energized and the switch 168 is closed, the electro-magnet 159 will be energized to draw the armature lever 150 into its full line position shown in Fig. 9. The armature lever 150 will then engage the insulated button 172 to effect closure of the switch 173. At this time, the pawl 145 is still holding the segment 140 and the switch arm 143 in their selected positions. Therefore, the spring arm 162 will be released and the switch 174 will be closed. Consequently, when the switch 173 is closed by the energization of the electro-magnet 159, a circuit will be established from the battery through the electro-magnet 175 as soon as the dial transmitter returns to initial position and closes the switch 127. A circuit will then be established from the battery through the conductor 134, switches 127 in series, conductors 176, 177, electro-magnet 175, conductor 178, switch 174, conductor 179, switch 173, conductors 180, 166 back to the battery 133. The energization of the electro-magnet 175 will act on the armature connected to the pawl 145 against the action of the spring 181. The armature of the pawl 145 may be pivoted at 182 to a bracket 183 secured to the panel-board 142.

From the foregoing it will be seen that the interlocking protecting electrical switches assure proper sequence in the operation of the remote control of the selector mechanism for tuning in certain predetermined broadcasting stations. When the switch arm 143 is in its initial position, the switches 160 and 174 are held in their open positions, as shown in Fig. 9. Therefore, as soon as the ratchet segment 140 is returned to initial position by the energization of the electro-magnet 175, the circuit of the latter magnet is opened at the switch 174. The only time that the electro-magnet 175 can be energized is when the switch arm 143 is on a selected contact 144 and the electro-magnet 159 is energized. As soon as the dial transmitter is actuated by the operator, the switch 127 is opened and this switch remains open until after the electro-magnet 61 for the desired station has been selected and energized. This selection is made by the return of the dial to its initial position. Therefore, not until the arm 143 has been stepped around to its desired position is the switch 127 again closed. The circuits and connections are such as to compel the stepping around of the switch arm 143 to the desired contact 144 while the dial transmitter is returning to its initial position before the electro-magnet 149 can be energized. The switch 160 is closed while such selection of one of the electro-magnets 61 is being made but not until the switch 127 is closed can the magnet 149 be energized and therefore not until the dial transmitter returns to initial position can the selected electro-magnet 61 be energized because energization of the selected electro-magnet depends upon the closure of the switch 148 and the closure of this switch depends upon the energization of the electro-magnet 149. Furthermore, the switch 148 must first be closed before the switch 164 can be closed, and not until the latter is closed are the solenoids 77 and 78 energized. Not until the latter have operated the selector mechanism is the switch 168 closed. The closure of the switch 168 is followed by the energization of the electro-magnet 159. This, in turn, is followed by the closure of the switch 173, and, finally, the electro-magnet 175 is energized to release the pawl 145. The energization of the electro-magnet 175 depends upon the closure of both of the switches 173 and 127 as well as upon the closure of the switch 174. As soon as the electro-magnet 159 is energized to effect closure of the switch 173, the switches 148 and 164 will be opened to effect deenergization of the selected electro-magnet 61 and of the solenoids 77 and 78. The switch 168 will then be opened. Upon the energization of the electro-magnet 175 to release the pawl 145, the spring 146 will return the switch arm 143 to initial position whereupon the switches 174 and 160 will be opened. It will thus be seen that when the selection of the desired broadcasting station has been made, all of the parts will be restored to their full line position shown in Figs. 1 and 9 and no current will be flowing through any of the electro-magnets since all of them are disconnected from the battery 133 after the desired broadcasting station has been tuned in.

When the spring 89, shown in Fig. 1, returns the plate 82 to its initial position, the actuator 91 thereon will engage the spring 92 to close the switch 90 and thus restore connection of the telephone receivers and loud speakers to the radio receiving set. One or more telephone receivers, or loud speakers, or both, may be associated with each dial transmitter at its particular location remote from the radio receiving set and the selector mechanism connected thereto.

In order to connect the radio receiving set to the source of electric power, a switch 184 may be located at the transmitter. As indicated at the lower left-hand portion of Fig. 5, this switch may be used to turn the power on or turn it off. In Fig. 10 is shown a plurality of switches 184 one for each of the dial transmitters and connected in parallel to each other so that the closure of any one of them will connect the battery 185 to the solenoid 186 of the relay 187. When the solenoid 186 is energized, the plunger 188 will move the switch plate 189 to connect the contacts 190 and thereby connect the battery or source of power 191 to the radio receiving set 192.

Also mounted on each of the dial transmitters, is a switch 193 for controlling the tone volume in the loud speakers or telephone receivers. As shown in Fig. 6, the switch 193 comprises a set of three contacts, the middle one 194 of which may be moved into engagement with the contact 195 for a soft tone and into engagement with the contact 196 for a loud tone. The contacts 194, 195, and 196 are connected respectively to the leads or conductors 197, 198 and 199, which extend to the radio receiving set where there is located the structure shown in Figs. 11 and 12, for operating the shaft 200 connected to a rheostat for one of the radio tubes in the receiving set. In other words, the shaft 200 may be connected to a filament rheostat so that when the current flow is decreased through the filament, a softer tone volume is effected and when the current flow is increased through the filament, a louder tone volume is obtained in the loud speakers or telephone receivers at the dial transmitting station.

As shown in Fig. 11, the conductor 197 of Fig. 6 is connected to the negative terminal of the battery 201, the positive terminal being connected by the conductor 202 to the spring terminals 203 and 204 mounted on the lower arm 205 of the vibrating device 206 which is secured to the shaft 200. The vibrating device 206 is provided with a pair of laterally extending arms 207 and 208 at the outer ends of which are armatures 209 and 210 located above the electro-magnets 211 and 212, respectively. The spring metal terminals 203 and 204 engage screw-threaded adjustable electric contacts 213 and 214, respectively. The contacts 213 and 214 are mounted on but insulated from the back plate 215 of the casing 216. The conductors 198 and 199 of Fig. 6 are connected as shown in Fig. 11, to the electro-magnets 212 and 211, respectively.

Extending upwardly from the central portion of the vibrating device 206 is a vertical arm 216 to which is pivoted at 217 a pair of pawls 218 and 219 associated respectively with the ratchet wheels 220 and 221. These ratchet wheels are mounted in spaced-apart relation in parallel planes, as shown in Fig. 12, and both are fixed to the shaft 200. The ratchet teeth extend in opposite directions on the ratchet wheels 220 and 221, as shown in Fig. 11.

The double pawl 218, 219 has an arm 222 extending upwardly from the pivot shaft 217 and to the upper end of this arm 222 are connected the springs 223 and 224, the other ends of which are connected to the brackets 225 and 226 secured to the plate 215.

When the switch contact 194 of Fig. 6 is moved into engagement with the contact 195, a circuit from the battery 201 is completed through the electro-magnet 212 and thereupon, its armature 210 will be drawn downwardly to move the arm 216 in a clockwise direction. This movement will cause the spring 223 to move the pawl 218 into engagement with the ratchet teeth of the ratchet wheel 220 and, consequently, the latter will be moved clockwise to step the shaft 200 around in a clockwise direction. The movement of the armature 210 also moves the arm 205 in a clockwise direction, which causes the spring 203 to become disengaged from the contact 213, thereby de-energizing the electro-magnet 212 to release the armature 210 and thereupon the spring 204 will move the spring 203 back into engagement with the contact 213. If, at this time, the contact 194 still engages the contact 195, the operation by the electro-magnet 212 will be repeated and the shaft 200 will be stepped forward again. In other words, so long as the contact 194 is held in engagement with the contact 195, the opening and closing of the switch 203, 213 will cause a step by step movement of the shaft 200 in a clockwise direction. As indicated at the lower right-hand portion of Fig. 5, downward movement of the lever of the switch 193 will effect engagement of the contacts 194 and 195 and produce a softer tone volume. Therefore, the shaft 200 of Figs. 11 and 12 should be connected to the rheostat to increase the ohmic resistance and decrease the current through the tube filament.

In the same manner, a louder tone volume may be secured by bringing into engagement the contacts 194 and 196 to effect energization of the electro-magnet 211. This will cause the switch 204, 214 to open and close repeatedly to secure operation of the pawl 219 against the teeth of the ratchet wheel 221 to rotate the shaft 200 in an anti-clockwise direction and thus decrease the ohmic resistance in circuit with the tube filament or increase the flow and thereby make the tone volume louder in the loud speakers or telephone receivers which are connected to the radio receiving set and located where the dial transmitters are stationed, remote from the radio receiving set and the selecting mechanism connected thereto.

Figs. 13 to 17, inclusive, illustrate a modified form of transmitter and the circuits and connections therefor. In this modified form, a casing 227 is mounted on a horizontal base plate 228, as shown in Figs. 15 and 16. Switch levers 229 are respectively associated with the designations 230 of the various broadcasting transmitting stations. As illustrated a rectangular plate 231 is provided with a rectangular opening 232 and secured to the top of the casing 227 in position to permit the label plate 233 to be slid under the raised portion of the plate 231, as shown in Fig. 16. The beaded rear edge 234 may act as an abutment against the rear edge of the raised portion of the plate 231.

The switch keys or levers 229 are each mounted loosely on the bearing shaft 235, the ends of which are secured to the brackets 236, 236 secured to the plate 237, as shown in Figs. 14 and 16. Between each key lever 229 and the next adjacent one is a spacer 238 which may be in the form of a cylindrical sleeve on the bearing shaft 235.

Each of the key levers 229 is provided with a toe 239 in position to engage the spring arm 240 so as to move the contact 241 into engagement with the contact 242 to electrically connect the conductors 243 and 244. Continued forward movement of the switch lever 229 will connect the contacts 245 and 246 to electrically connect the conductors 244 and 247.

The switch 241, 242 will first be closed and this will be followed by the closure of the switch 245, 246. The closure of the switch 241, 242 will effect the energization of the extreme left-hand selector electro-magnet 61 which is connected to the selector mechanism shown in Fig. 1. In the same manner, operation of any of the other switch keys 229 will effect the energization of the desired selector electro-magnet 61 corresponding to the broadcasting station designated on the transmitter. In Fig. 14, the circuit for the selector electro-magnet 61 will be from the battery 248 through the conductor 249, the selected electro-magnet 61, conductor 243, switch 241, 242, conductor 244, to the other side of the battery 248.

Since the switch 245, 246 closes after the switch 241, 242 has been closed, the circuit through the solenoids 77 and 78 will not close until after the selected electro-magnet 61 has been energized. The latch 56 of Fig. 1 will therefore be in its dotted line position when the solenoids 77 and 78 are energized. The circuit through the solenoids 77, 78 in Fig. 14 will be from the battery 248 through the conductor 250, conductor 247, switch 245, 246, and conductor 244 to the other side of the battery 248.

As shown in Fig. 13, a switch key 251 is provided at the left-hand end of the transmitter for producing soft tone volume. At the right hand end of the transmitter, a switch key 252 is provided for effecting loud tone volume. In Fig. 14, the circuits and connections are shown for effecting the energization of the solenoids 211 and 212. The electro-magnet 211 is controlled by the switch key 252 to control the loud tone volume and the electro-magnet 212 is operated by the switch key lever 251 to control the soft tone volume. The switches 203, 213 and 204, 214 are illustrated diagrammatically in Fig. 14.

Figure 17:
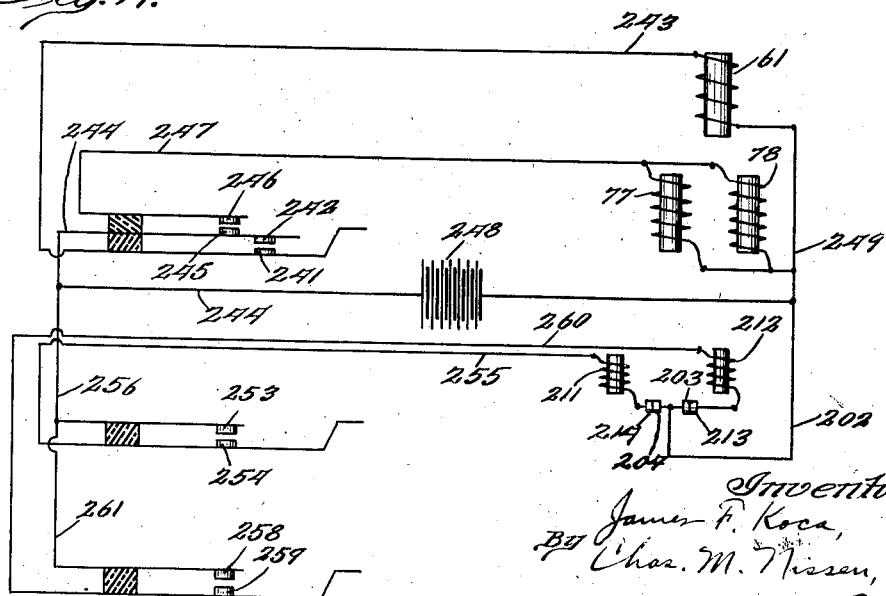
Fig. 17 is a wiring diagram illustrating the operation of the transmitter shown in Figs. 13 to 16, inclusive, when connected to a volume controlling device shown in Figs. 11 and 12 and to the selective tuning mechanism shown in Figs. 1 to 4, inclusive.

A simplified wiring diagram is shown in Fig. 17 to more clearly illustrate the connections of the loud and soft switch levers to the battery 248 and the electro-magnets 211 and 212. When the loud switch lever 252 is operated to connect the switch contacts 253 and 254, the battery 248 will be connected through the conductor 202 and the switch 204, 214 to the electro-magnet 211 and then through the conductor 255, switch 253, 254, and conductors 256, 244 to the other side of the battery 248. When the soft switch lever 251 is operated, the switch 258, 259 will be closed and this will close a circuit from the battery 248 through the conductor 202, switch 203, 214, electro-magnet 212, conductor 260, switch 258, 259 and conductors 261, 256, 244, to the other side of the battery. It will thus be seen that by closing the switch 253, 254 by means of the loud key lever, the electro-magnet 211 will be operated to move the shaft 200 of Fig. 11 step by step in an anti-clockwise direction. By operating the soft key lever 251, the switch 258, 259 will be closed to energize the electro-magnet 212 which will cause the operation of the shaft 200 in a clockwise direction with a step by step movement.

Fig. 17 also shows diagrammatically the circuits and connections for the switches 241, 242 and 245, 246 for successively energizing the selector electro-magnet 61 and the solenoids 77, 78 in parallel. It should be understood that the solenoids 77, 78 may be connected either in series, as shown in Fig. 9, or in parallel, as shown in Figs. 14 and 17.

By referring to Fig. 16, it will be seen that when the switch key lever 229 is released, the resiliency of the spring arm 240 will automatically return the key lever to initial position and also open the switches 241, 242 and 245, 246. In the same manner, when the soft and loud key levers 251 and 252 are released, they will be automatically returned to their initial positions and their respective switches automatically opened. When the selected broadcasting station is tuned in at the radio receiving set, all of the electromagnets shown in Figs. 14 and 17 are de-energized.

In order to prevent any more than one of the switch levers 229, 251 and 252 from being operated at a time, each of these levers is provided with a forwardly extending arm 257, the lower side of which is V-shaped, as shown at 262 in Fig. 15. The arms 257 move in slots 263 in an elongated grooved bar 264 which is C-shaped in cross section as shown in Fig. 16. The front side of this grooved bar 264 is closed by a plate 265 and in the grooves are located a series of rollers 266 which entirely fill the groove between end abutments 267 and 268 mounted on brackets 269 and 270 on the plate 237, except that just sufficient space is permitted for a single one of the arms 257 to move in its slot 263. The bottom V-shaped sides of the arms 257 act as wedges to move the rollers to one side or the other so as to clear the space for the single arm 257 to move in its slot 263. When an operated switch lever 229, 251 or 252 is released, any other single switch lever is free to be operated to depress its arm 257, but when this has been done, all of the other switch levers are locked against operation by the rollers or discs 266.

I claim:

1. In a radio tuning selector, the combination with a tuning shaft, of a plurality of operating devices therefor corresponding to various broadcasting stations, a plurality of actuators one for each of said devices, a plurality of selector magnets one for each of said actuators, and electro-magnetic mechanism for operating a selected actuator to in turn operate the selected device to turn said shaft to a predetermined position corresponding to the broadcasting station selected.

2. In a remote controlling system for radio receiving sets, the combination with an actuator connected to the tuning elements of a radio station receiving set, of a plurality of selector magnets one for each of a plurality of broadcasting stations, a plurality of setting devices for said actuator one for each of such broadcasting stations, a common operating magnet, and connectors operated by said selector magnets for causing said operating magnet to operate the setting device corresponding to the operated selector magnet.

3. In remote control of radio receiving sets, the combination with a tuning shaft, of a plurality of devices for operating said shaft to tune in any one of a plurality of broadcasting stations, a plurality of selector magnets one for each of said devices, electro-magnetic means for operating said devices, and a plurality of connectors one for each of said devices and operable by said selector magnets to effect connection between said electro-magnetic means and said devices.

4. In a radio tuning selector, the combination with selector devices one for each broadcasting station, of operating levers one yieldingly connected to each of said selector devices, automatic means for actuating the selected lever, and a plurality of electro-magnetic selector devices one for each of said levers.

5. In a radio tuning selector, the combination with a tuning shaft, of a plurality of operating devices therefor corresponding to various broadcasting stations, each of said devices comprising a pivoted latch, a plurality of magnetic armatures one for each of said latches, a plurality of selector magnets one for each of said armatures, a common catch for all of said latches, and an electro-magnet for operating said catch to actuate the operating device selected by one of said selector magnets moving its latch into the path of said catch.

6. In a radio tuning selector, the combination with a plurality of tuning in devices each comprising an operating lever, actuating levers one for each of said operating levers, a pin and slot connection between said levers, means for selecting any one of said actuating levers for operation, means for operating the selected actuating lever, and a spring for transmitting movement from the selected actuating lever to the adjacent operating lever, the pin and slot connection between the levers permitting the actuating lever to move forward somewhat after the operating lever stops.

7. In selector mechanism for radio tuning, the combination with a plurality of devices for tuning in any one of a plurality of broadcasting stations, of electro-magnetic means for selecting one of said devices to be operated, electro-magnetic operating means having a normal inoperative position for operating the selected device, a speaker operatively connected to the output circuit of the radio receiver, a switch in the circuit for controlling the speaker, said switch being controlled by the operating means so that it is in one position when the operating means is in normal inoperative position and in another position when the operating means is not in normal inoperative position whereby the switch will cut out the speaker during the tuning in period so that the speaker will not receive signals from other than the predetermined broadcasting station.

8. In selector mechanism for tuning in radio receiving sets, the combination with a transmitter, of a plurality of tuning in devices for various broadcasting stations, a plurality of selector electro-magnets therefor, electro-magnetic mechanism for operating the selected device, step-by-step electro-magnetic switch mechanism for selecting one of said first-named electro-magnets, circuits and connections for effecting the energization of the selected electro-magnet and the operation of said electro-magnetic mechanism when the transmitter is in a predetermined position, and electric switch interlocking mechanism to prevent the energization of any selector electro-magnet except the one predetermined for selection.

9. In remote control apparatus for radio receiving sets, the combination with a tuning actuator, of a plurality of devices for operating said actuator to tune in any one of a plurality of broadcasting stations, a pivotally mounted sector cooperable with each device, electro-magnetic means for operating said devices, brake mechanism cooperating with the electro-magnetic means for retarding the operation of the electro-magnetic means, and means for selecting the device to be operated by the electro-magnetic means.

10. In a radio tuning selector, the combination with a tuning shaft, an operating device therefor corresponding to a broadcasting station, an actuator for said device, an electro-magnetic selector for said actuator, and electro-magnetic mechanism for operating said selected actuator to in turn operate said selected device to turn said shaft to a predetermined position corresponding to said broadcasting station.

11. In a radio tuning selector, the combination with a tuning actuator, of a plurality of devices for operating said actuator each to a predetermined extent to tune in a corresponding broadcasting station, a series of electro-magnetic selectors one for each of said broadcasting stations, a single electro-magnetic device for operating the selected actuator operating device, and a dash-pot connected to said single electro-magnetic device to retard the operation thereof when energized.

12. In a radio tuning selector, the combination with a tuning selector, of a plurality of operating devices therefor corresponding to various broadcasting stations, each of said devices comprising a pivoted latch, a plurality of magnetic armatures one for each of said latches, a plurality of selector magnets one for each of said armatures, a common catch for all of said latches, an electro-magnet for operating said catch to actuate the operating device selected by one of said selector magnets moving its latch into the path of said catch, a dash-pot for retarding the operating movement of said catch, and a spring for restoring said catch to initial position and so also said operating electro-magnet.

13. In a radio tuning selector, the combination with a tuning shaft of a spur gear thereon, oppositely moving rack bars meshing with spur gear, cross-pieces on said rack bars, a pivoted lever, a crescent pivoted to said lever and having projections in position to engage said cross-pieces, means for holding said crescent in adjusted position, an operating lever yieldingly connected to said first-named lever, an electro-magnetic mechanism for actuating said operating means, and a dash-pot for retarding the moving of said electro-magnetic mechanism.

14. In a radio tuning apparatus, a plurality of actuators for a common tuning mechanism, means for selecting said actuators individually for operation, a remotely situated dial operating automatically upon release to send a series of electric impulses to operate a predetermined selecting means, an electro-magnetic switch responsive to such impulses to predetermine the selecting means to be operated, and means controlled by a switch at the dial for automatically effecting the operation of said selecting means and said actuators.

15. In a remote control system for radio receiving sets, a set tuning mechanism, a plurality of actuators each adapted on operation to move said tuning mechanism to a predetermined position, electro-magnetic selecting means for selecting an actuator for operation, electro-magnetic operating means for operating the selected actuator, a loud speaker having a control circuit, and switch mechanism for opening said circuit during operation of said electro-magnetic operating means.

JAMES F. KOCA.